UNITED STATES PATENT OFFICE.

JOHN W. HOARD, OF PROVIDENCE, RHODE ISLAND.

IMPROVEMENT IN MARKING-SLATES.

Specification forming part of Letters Patent No. 16,687, dated February 24, 1857.

*To all whom it may concern:*

Be it known that I, JOHN W. HOARD, of the city and county of Providence, and State of Rhode Island, have invented a new and useful Improvement in the Manufacture of Artificial Slates for Writing or Marking; and I hereby declare that the following is a full, clear, and exact description of the same.

The nature of my improvement consists in the employment of liquid quartz or soluble liquid glass as the vehicle for producing a paste or solution, when combined with the oxide of zinc as a drier or coloring agent and to prevent deliquescence, to produce or manufacture writing or marking slates, as herein described.

To enable others skilled in the art to make and use my invention, I will proceed to describe it.

I take liquid quartz made in any of the known ways, as described in works on chemistry, such as that described in Knapp's Chemical Technology, pages 147, 148, 149, volume 2, published by Lea & Blanchard, Philadelphia, 1849, and I evaporate it to the consistence of thin cream. This is the normal condition in which I employ it.

To make a white slate for writing or marking upon with a graphite pencil, I mix with the soluble quartz mentioned three times its weight of the white oxide of zinc and knead these two substances rapidly together into a paste. I then spread some of this paste on a sheet of pasteboard of the size designed for a slate and run it between a pair of smooth rollers; then spread this paste evenly and smoothly on the pasteboard, which is set aside to dry. In about twenty-four hours this soluble glass paste on the pasteboard is dry enough for use, if exposed to a temperature of about 60° Fahrenheit, and is found to adhere tenaciously to the pasteboard, forming a hard, smooth coating—a beautiful slate for writing upon with a lead-pencil.

To make colored slates for marking with a slate-pencil, I proceed in the same manner as has been described, only I employ what is known in commerce as the "gray oxide of zinc," which is an impure oxide containing smoke or charcoal, instead of the white, as a drier, coloring agent, and preventer of deliquescence.

I can put a colored paste on one side of a sheet of pasteboard, and a white paste on the other, thus forming a slate for writing or marking with two kinds of pencils. I may also employ other coloring, drying, and anti-deliquescent agents for making slates with liquid quartz; but the oxide of zinc I have found to be very convenient and excellent.

The paste described for manufacturing slate can be put on wood and iron as well as on pasteboard. It makes a very superior substitute for common blackboards in academies and schools.

The compound paste described may be put on with a brush by diluting it to the proper consistency with water and allowing it to dry in successive coats.

My invention makes the most beautiful artificial marking-slates in the world, far surpassing the best natural kind or any artificial kind that ever has been manufactured, and such slates can be manufactured very cheap.

I am well aware that ground glass has been employed, combined with glue and varnish, for making artificial writing-slates; but such slates are liable to be spoiled with moisture and water, and, besides, they are rough in comparison with the kind manufactured according to my invention. Liquid quartz alone is too deliquescent in its nature after it dries to be fit for manufacturing slates, coating for walls, or enameled surfaces; but by employing it as I do, as a vehicle, and mixing it with a drying and anti-deliquescent substance, like the oxide of zinc, I form the superior artificial slate for the purposes described.

Having thus described my invention in the manufacture of artificial slate, I do not claim liquid quartz itself for producing indurative surfaces for marking upon, but I claim it as the vehicle for manufacturing artificial marking or writing slate, when combined with oxide of zinc as a drying, anti-deliquescent, and coloring substance, in the manner and for the purpose set forth.

J. W. HOARD.

Witnesses:
J. F. BUCKLEY,
S. C. COHEN.